(12) United States Patent
Housty et al.

(10) Patent No.: US 8,176,303 B2
(45) Date of Patent: May 8, 2012

(54) MULTIPROCESSOR COMMUNICATION DEVICE AND METHODS THEREOF

(75) Inventors: Oswin E. Housty, Austin, TX (US); Bernucho S Krishna, Austin, TX (US)

(73) Assignee: GlobalFoundries Inc.

( * ) Notice: Subject to any disclaimer, the term of this patent is extended or adjusted under 35 U.S.C. 154(b) by 800 days.

(21) Appl. No.: 12/203,456

(22) Filed: Sep. 3, 2008

(65) Prior Publication Data

US 2010/0058044 A1 Mar. 4, 2010

(51) Int. Cl.
*G06F 9/00* (2006.01)
(52) U.S. Cl. .................................. 713/1; 713/2
(58) Field of Classification Search .............. 713/1, 2, 713/100
See application file for complete search history.

(56) References Cited

U.S. PATENT DOCUMENTS

| | | | | |
|---|---|---|---|---|
| 4,698,746 A | * | 10/1987 | Goldstein | 710/113 |
| 6,687,851 B1 | * | 2/2004 | Somers et al. | 714/12 |
| 6,976,155 B2 | * | 12/2005 | Drysdale et al. | 712/225 |

* cited by examiner

*Primary Examiner* — Paul Yanchus, III

(57) ABSTRACT

During a boot process of a data processing device having a master bootstrap processor device and multiple slave processor devices, memory associated with the master bootstrap processor is not accessible. Accordingly, the master bootstrap processor communicates configuration information to a slave processor by writing configuration information to a register associated with the slave processor. The slave processor communicates an acknowledgment to the master bootstrap processor in response to reading the configuration information.

20 Claims, 3 Drawing Sheets

MULTIPROCESSOR COMMUNICATION DEVICE AND METHODS THEREOF

BACKGROUND

1. Field of the Disclosure

The present disclosure relates generally to data processing devices, and more particularly to data processing devices having multiple processor devices.

2. Description of the Related Art

Some data processing devices include multiple processor devices. During a boot process of the data processing device, each processor device is configured before it can access an associated memory device. This configuration process is generally administered by one of the individual processor devices, referred to as a "master bootstrap processor." The master bootstrap processor configures the other processor devices, which are referred to as "slave processors." In some data processing devices, the master bootstrap processor communicates configuration information to the slave processors by means of interface circuitry known as an advanced programmable interrupt controller (APIC) that is associated with each processor.

Through the local APIC associated with each processor, an inter-processor interrupt (IPI) can be used to perform a remote read. In order to initiate a remote read, a sequence of memory-mapped reads and writes are performed. This method can be undesirably slow because the master bootstrap processor broadcasts each remote read IPI to all processors in the data processing device and waits for a receipt acknowledgement from each slave processor.

BRIEF DESCRIPTION OF THE DRAWINGS

The present disclosure may be better understood, and its numerous features and advantages made apparent to those skilled in the art by referencing the accompanying drawings.

DETAILED DESCRIPTION

A data processing device having a master bootstrap processor device and multiple slave processor devices is disclosed. During a boot process of the data processing device, memory associated with the master bootstrap processor is not accessible. Accordingly, the master bootstrap processor communicates configuration information to a slave processor by writing configuration information to a register associated with the slave processor. The slave processor communicates an acknowledgment to the master bootstrap processor in response to reading the configuration information.

Figure 1:
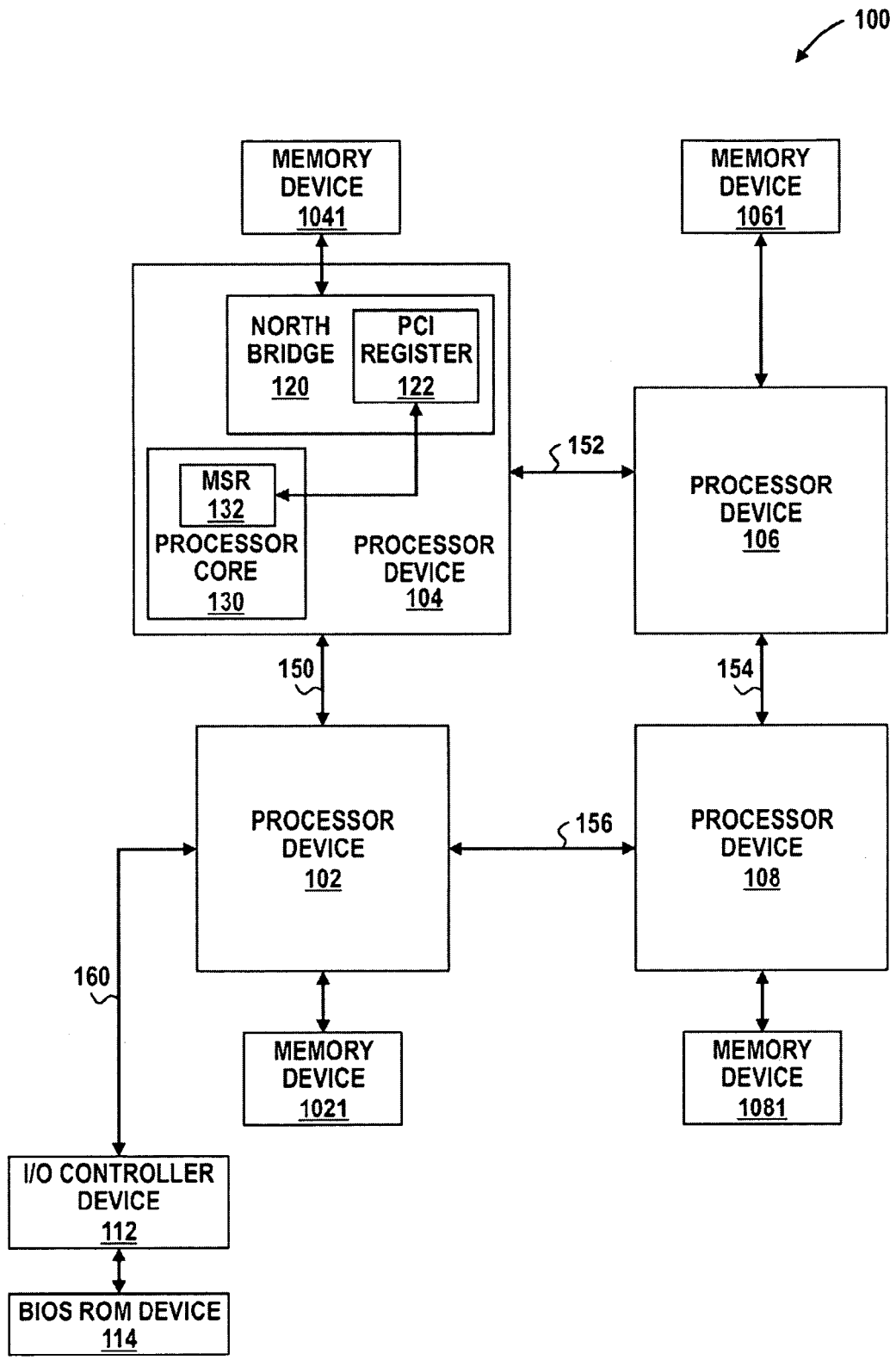
FIG. 1 includes a block diagram illustrating a multiprocessor device in accordance with a specific embodiment of the present disclosure.

FIG. 1 includes a block diagram illustrating a multiprocessor device 100 including processor devices 102, 104, 106, and 108, memory devices 1021, 1041, 1061, and 1081, an I/O controller device 112, a BIOS ROM device 114, and links 150, 152, 154, 156, and 160. Memory device 1021 is connected to processor device 102, memory device 1041 is connected to processor device 104, memory device 1061 is connected to processor device 106, and memory device 1061 is connected to processor device 106. I/O controller device 112 is connected to processor device 102 via link 160, and BIOS ROM device 114 is connected to I/O controller device 112.

Processor device 104 includes a northbridge 120 and a processor core 130. Northbridge 120 includes a PCI register 122, and processor core 130 includes a MSR 132. Memory device 1041 is connected to northbridge 120. Processor devices 102, 106, and 108 can also include one or more PCI registers and associated MSRs (not shown).

A processor device, such as processor device 104, is configured to undergo a boot process to initialize the processor device. After initialization, each processor device can process information and thus perform an assigned task, by executing instructions contained in an associated memory device, such as memory device 1041. During execution of the assigned task, processor device 104 can save and retrieve information at memory device 1041 by performing store and load instructions. Processor device 104 can include one or more than one processor cores, such as processor core 130. Each processor core can perform a unique task, or can perform a portion of a larger task in association with other processor cores or in association with other processor devices. Each of the processor devices 102, 104, 106, and 108 can communicate with another processor device by sending and receiving information via one of the associated links 150, 152, 154, and 156.

I/O controller 112 is configured to provide access to BIOS ROM device 114. I/O controller 112 is connected to processor device 102 via link 160. In the particular embodiment illustrated, link 160 is assumed to be a Hyper Transport (HT) link and to support a peripheral component interconnect (PCI) bus protocol. I/O controller 112 is an external peripheral device accessible to processor device 102 via a PCI interface.

For purposes of discussion, processor device 102 is assumed to be designated as a master bootstrap processor device and processor devices 104, 106, and 108 are assumed to be slave processor devices. When power or a reset signal are first received by multiprocessor device 100, the boot process is initiated. In response, master bootstrap processor device 102 begins executing boot instructions stored in a basic input/output system (BIOS) read only memory (ROM) device, such as BIOS ROM device 114, to initialize the multiprocessor device 100.

Processor device 104 includes a northbridge 120 that is shared by processor device core 130 and other processor cores (not illustrated) included at processor device 104. Northbridge 120 is configured to provide access to and from memory device 1041, and includes other resources that are shared by individual processor cores of processor device 104. One such resource is the PCI register 122. PCI register 122 can provide an interface to peripheral devices external to processor device 104, such as another processor device, by communicating information with the external peripheral device via a PCI bus protocol. The PCI bus protocol is supported by links 150, 152, 154, 156, and 160. Each PCI register, such as PCI register 122, is configured with a unique address that differentiates that PCI register from all other PCI registers included at multiprocessor device 100. For example, processor device 104 can store information in a PCI register at processor device 106 by providing the unique address of the PCI register at processor device 106.

Each individual processor core, such as processor core 132 of processor device 104, includes a model-specific register (MSR), such as MSR 132 of processor core 130. MSR 132 can be used to store information specific to that individual processor core. Furthermore, MSR 132 is automatically updated with information that is placed into PCI register 122 of northbridge 120, and processor core 130 can store information into PCI register 122. Thus, information can be exchanged between a device external to processor device 104 and an individual processor core, such as processor core 130 using PCI register 122 and MSR 132.

For example, processor device 102 can send configuration information to processor core 130 of processor device 104 by writing the information to PCI register 122. This is accomplished by using the PCI bus protocol conveyed by links 150, 152, 154, and 156, and by providing the unique address assigned to PCI register 122. The information is automatically copied from PCI register 122 into MSR 132 of the target core, processor core 130. For example, in an embodiment, a hardware module (not illustrated) determines that information has been written to the PCI register 122 and, in response, automatically transfers the information stored at the PCI register 122 to the MSR 132. Processor core 130 can write acknowledgment information into PCI register 122 to indicate that is has received the configuration information, and processor device 102 can subsequently read the acknowledgment information. Accordingly, processor device 102 can use PCI and MSR registers associated with each processor device, or each processor core, to communicate configuration information to each device or core.

To illustrate, when multiprocessor device 100 is reset, or when power is first applied, processor device 102, designated as the master bootstrap processor device, starts executing boot instructions from BIOS ROM device 104. These instructions implement a program that can be referred to as a "boot program." By executing the boot program, processor device 102 can initialize individual devices of multiprocessor device 100. For example, processor device 102 can configure each of processor devices 102, 104, 106, and 108 so that they can access their corresponding memory devices 1021, 1041, 1061, and 1081. In an embodiment, processor device 102 configures a dynamic random access memory device (DRAM) controller (not shown) associated with each memory device 1021, 1041, 1061, and 1081 with suitable memory access timing parameters so that each processor device can access the associated memory device.

Figure 2:
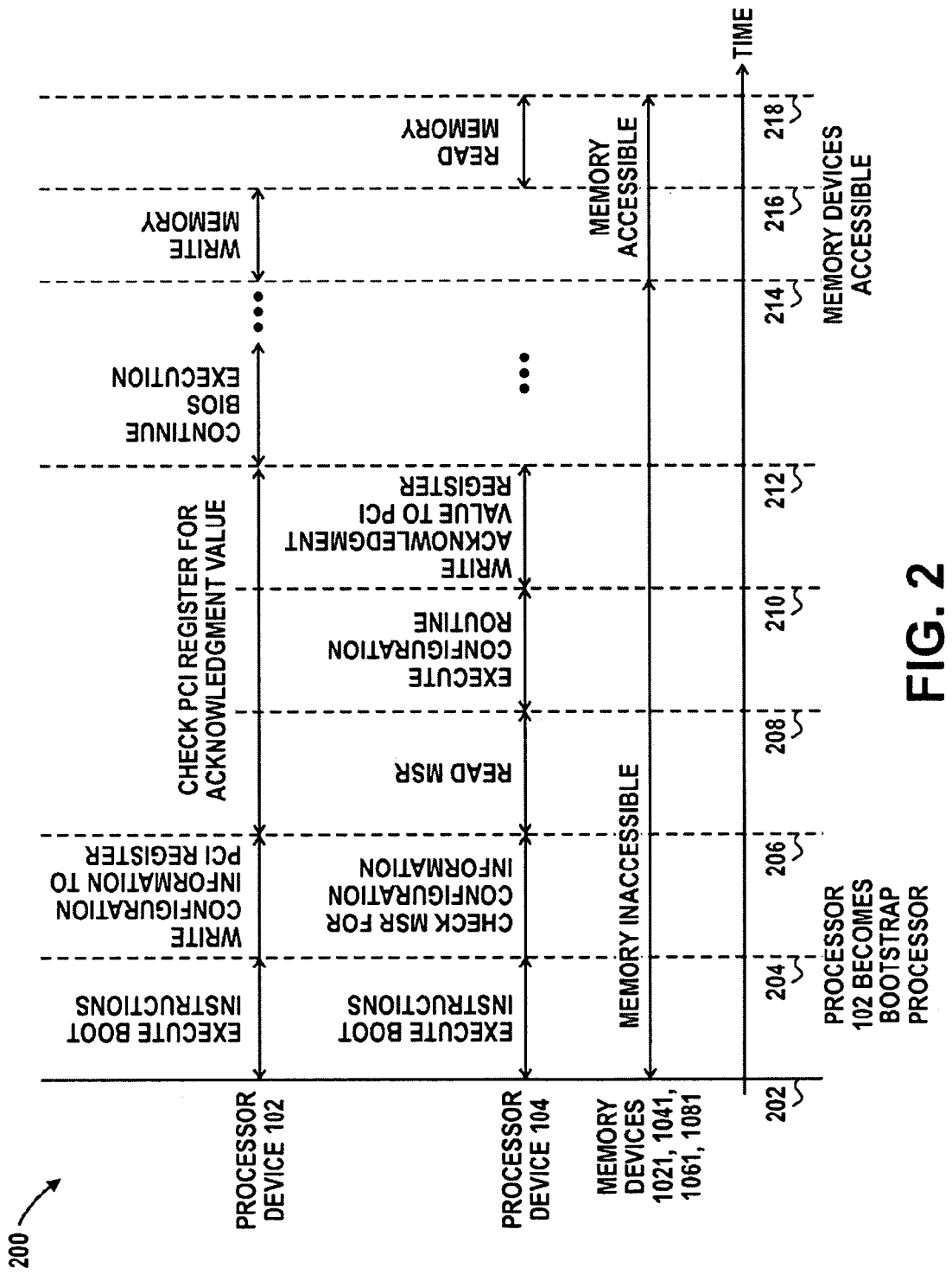
FIG. 2 includes a graph illustrating a procedure by which processor devices can exchange information in accordance with a specific embodiment of the present disclosure.

FIG. 2 includes a graph 200 illustrating a portion of a boot procedure by which processor devices can exchange information, in accordance with an embodiment of the present disclosure. Graph 200 represents operations supported by multiprocessor device 100 at FIG. 1. The horizontal axis represents time, while the vertical axis indicates which of processor device 102, processor device 104, and, collectively, memory devices 1021, 1041, 1061, and 1081 are associated with a designated action or event. Graph 200 thus illustrates a sequence of events commencing or completing at particular points in time identified by references 202, 204, 206, 208, 210, 212, 214, 216, and 218.

At time 202, processor devices 102 and 104 are reset, and processor 102 begins executing applicable boot instructions stored at BIOS ROM device 114. Memory devices 1021, 1041, 1061, and 1081 are not accessible during this phase. At time 204, processor device 102 is established as the master bootstrap processor device and begins initializing each processor device. Processor device 102 writes configuration information to PCI register 122 at processor device 104, while processor device 104 monitors MSR 132 for arrival of new information. The information written to the PCI register 122 is automatically copied (e.g. by a hardware module) from the PCI register 122 to the MSR 132. At time 206, processor device 104 reads the new configuration information which was automatically copied from PCI register 122 into MSR 132, and processor device 102 begins checking PCI register 122 for a defined acknowledgment value. At time 208, processor device 104 retrieves boot instructions from the BIOS ROM device 114 and executes the boot instructions based on the new configuration information received from processor device 102. In an embodiment, the processor device 104 executes the boot instructions to configure the associated memory device 1041 for subsequent access after completion of the boot phase. At time 210, processor device 104 writes an acknowledgment value into PCI register 122 to inform processor device 102 that the configuration information was received and the resulting execution of the set of boot instructions has been completed, and this acknowledgment is read by processor device 102. In other embodiments, the acknowledgment can be written to the PCI register 122 prior to completion of the execution of the set of boot instructions. For example, the value can be written to indicate that execution of the set of boot instructions has been initiated.

At time 212, processor device 102 continues to execute boot instructions and continues to exchange information with processor device 104. Processor device 102 also provides configuration information to processor devices 106 and 108 in the same manner described above with respect to processor device 104. At time 214, the processor devices 102-108 have been initialized and each respective processor device can access its corresponding memory device 1021-1081. At this time, processor device 102 performs a memory access, writing information to memory device 1021 or other memory device and at time 216, processor device 104 accesses the information by accessing the memory device where it is stored. Accordingly, prior to initialization of memory (e.g. during the boot phase), the processor device 102 communicates with processor devices 104, 106, and 108 by storing information at registers associated with the processor devices. After memory has been initialized, the processor devices 102-108 can communicate with each other by writing to and reading from memory.

A significant amount of inter-processor communication can occur during the boot process. Using PCI registers, such as PCI register 122, in conjunction with MSRs, such as MSR 132, multiprocessor device 100 can conduct this inter-processor communication at an increased speed relative to using an APIC, thereby improving the efficiency of the boot process.

Figure 3:
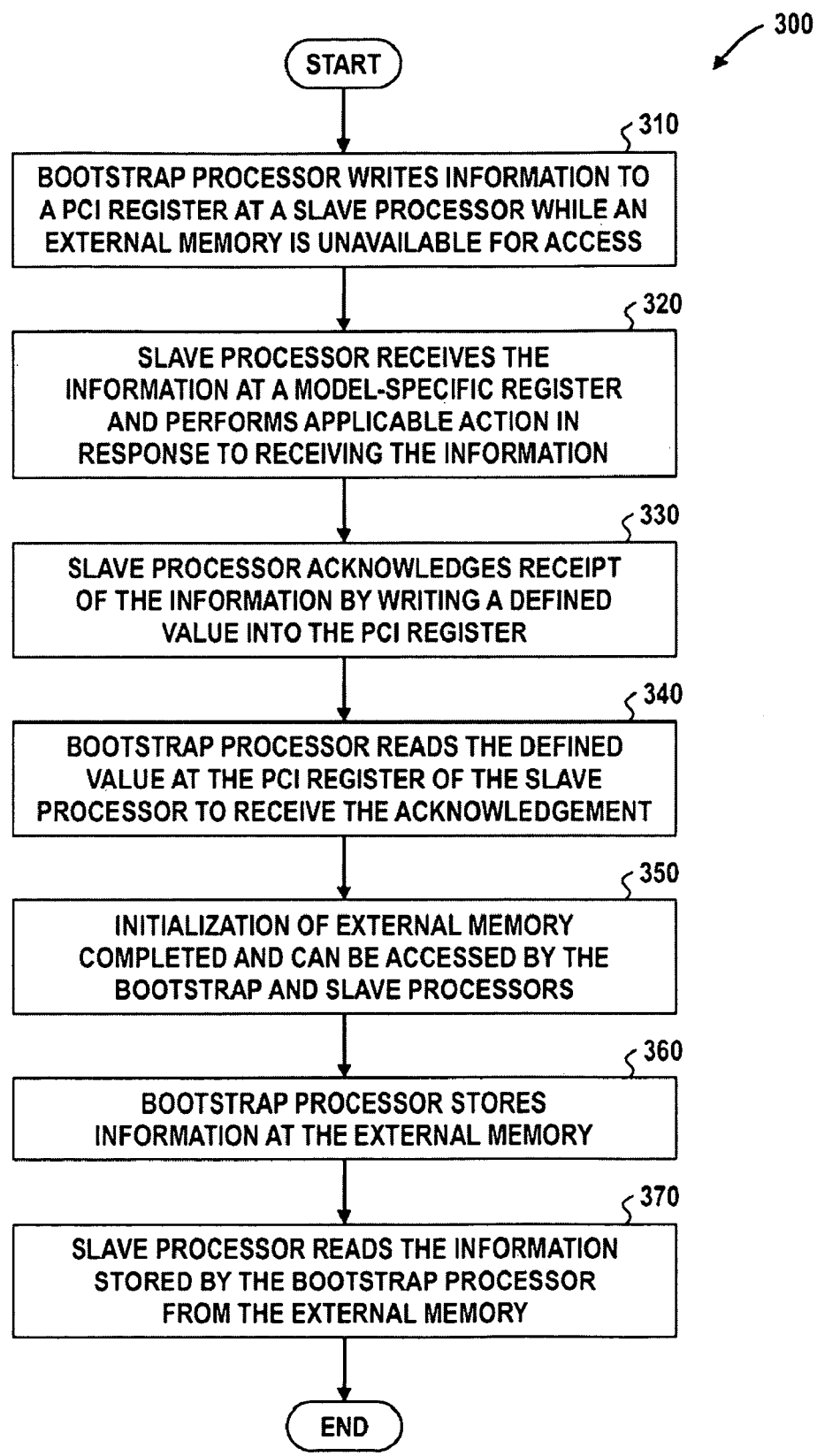
FIG. 3 includes a flow diagram illustrating a method in accordance with a specific embodiment of the present disclosure.

FIG. 3 includes a flow diagram illustrating a method 300 in accordance with a specific embodiment of the present disclosure. At block 310 a processor, determined to be a bootstrap processor, writes information to a PCI register at a slave processor, such as PCI register 122 at FIG. 1. The bootstrap processor can represent processor device 102, and the slave processor can represent processor device 104, both at FIG. 1. At block 320, the slave processor receives the information at a model-specific register (MSR), such as MSR 132 at FIG. 1, and the slave processor performs any applicable action in response to receiving the information. The MSR is automatically updated when the PCI register is modified. At block 330, the slave processor acknowledges receipt of the information by writing a defined value into the PCI register. At block 340, the bootstrap processor reads the defined value at the PCI register of the slave processor to receive the acknowledgement. Additional inter-processor communication as described in blocks 310-340 can be performed with other slave processors to conduct an initialization procedure. The initialization procedure includes initializing each processor device so that a respective processor device can access a corresponding external memory device. At block 350, the external memory is available for access by the bootstrap processor and the slave processors. At block 360, the bootstrap processor stores information at the external memory, and at block 370, the slave processor reads the information from the external memory.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

For example, multiprocessor device 100 at FIG. 1 includes four processor devices, but a multiprocessor device can include a fewer or a greater number of processor devices. Each processor device can include one or more than one individual processor cores.

Multiprocessor device 100 uses HT links to support inter-processor device communication, and the HT links support the PCI bus protocol. Other types of inter-processor links can be used, such a common front-side bus and external northbridge devices. Such an implementation can provide inter-processor communication via PCI bus protocol, as disclosed herein. The unique address associated with a specific PCI register includes a bus, a device, and function numbers as specified in the PCI-standard networking packet protocol.

Even though a single PCI register, PCI register 122, and a single MSR, MSR 132, are illustrated at FIG. 1, a specific embodiment can include multiple PCI registers and multiple MSRs. In a particular embodiment, northbridge 120 can include a respective PCI register dedicated to each corresponding processor core, and information written to a specific PCI register is automatically copied into a MSR at a processor core that corresponds to that particular PCI registers. In yet another embodiment, a PCI register can be included at northbridge 120 that can be used to provide data to all processor cores simultaneously. In this case, data written into this PCI register is automatically copied into a corresponding MSR at each processor core.

Multiprocessor device 100 includes memory devices 1021, 1041, 1061, and 1081. Each of these memories is directly accessible by the corresponding processor device. Multiprocessor device 100, responsive to an operating system program, can assign a particular address range to each individual memory device, and can effectively consolidate memory space provided by the individual memory devices into a single virtual memory space. Thus, the operating system can facilitate access by any processor device to any memory device. As used herein, "initialing the memory for access" includes initializing processor devices, and associated memory control and DRAM control devices, so that each respective processor device can access a corresponding external memory device.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method, comprising:
   storing first configuration information from a first processor device at a first register of a second processor device during a boot phase of a device, the second processor device comprising the first register and a second register;
   storing the first configuration information at the second register associated with the first register; and
   receiving a first acknowledgment at the first processor device in response to storing the first configuration information at the second register, the first acknowledgment indicating the second processor device has initialized execution of a first set of boot instructions.

2. The method of claim 1, wherein the first set of boot instructions initializes a memory external to the second processor device.

3. The method of claim 2, wherein the second register is a model-specific register (MSR) of the second processor device.

4. The method of claim 1, wherein the first register is associated with a northbridge, the northbridge associated with the second processor device.

5. The method of claim 1, wherein receiving the first acknowledgment comprises:
   reading the first register at the first processor device to determine a first value;
   determining the first acknowledgement in response to determining the first value matches a defined value.

6. The method of claim 1, wherein storing the first configuration information comprises storing the first configuration information in response to determining the first processor device is a bootstrap processor of a plurality of processor devices.

7. The method of claim 1, further comprising:
   storing second configuration information from the first processor device at a third register during the boot phase; and
   receiving a second acknowledgment at the first processor device during the boot phase, the second acknowledgment indicating a third processor device has read the second configuration information at the third register.

8. The method of claim 7, further comprising:
   executing a second set of boot instructions at the third processor device in response to reading the second configuration information at the third register; and
   communicating the second acknowledgment to the first processor device during the boot phase in response to initiating execution of the second set of boot instructions.

9. The method of claim 8, wherein executing the second set of boot instructions comprises initializing a memory external to the third processor device based on the second set of boot instructions for access.

10. The method of claim 8, wherein:
    reading the second configuration information at the third register comprises copying the second configuration information from the third register to a fourth register; and
    wherein executing the second set of boot instructions at the third processor device comprises the second set of boot instructions copying the second configuration information to the fourth register.

11. The method of claim 10, wherein the fourth register comprises a model-specific register (MSR) of the third processor device.

12. A method, comprising:
- determining at a first processor device that first configuration information has been stored at a first register of the first processor device during a boot phase of a device;
- copying the first configuration information from the first register to a second register of the first processor device;
- executing a first set of boot instructions in response to determining the first configuration information has been stored at the second register; and
- communicating an acknowledgment to a second processor device during the boot phase in response to executing the first set of boot instructions.

13. The method of claim 12, wherein the first set of boot instructions initializes a memory external to the first processor device.

14. The method of claim 12, wherein communicating the acknowledgement comprises storing a defined value at the first register.

15. The method of claim 12, wherein determining the first configuration information has been stored comprises determining the first configuration information has been stored in response to determining the first processor device is a slave processor device relative to the second processor device.

16. The method of claim 12, wherein the second register comprises a model-specific register (MSR) of the first processor device.

17. A device, comprising:
- a first BIOS memory configured to store a set of boot instructions;
- a first processor device coupled to the first BIOS memory, the first processor device comprising a first register and a second register, the second register configured to store information stored at the first register, the first processor device configured to execute the set of boot instructions in response to a defined value being stored at the second register; and
- a second processor device coupled to the first processor device, the second processor device configured to store first configuration information at the first register during a boot phase and to receive an acknowledgment during the boot phase that the first processor device has executed the first set of boot instructions.

18. The device of claim 17, further comprising
- a memory coupled to the first processor device, the memory configured to be initialized for access by the set of boot instructions.

19. The device of claim 17, wherein the first processor device comprises:
- a northbridge comprising the first register.

20. The device of claim 17, wherein the second register comprises a model-specific register (MSR) of the first processor device.

* * * * *